UNITED STATES PATENT OFFICE 2,179,137

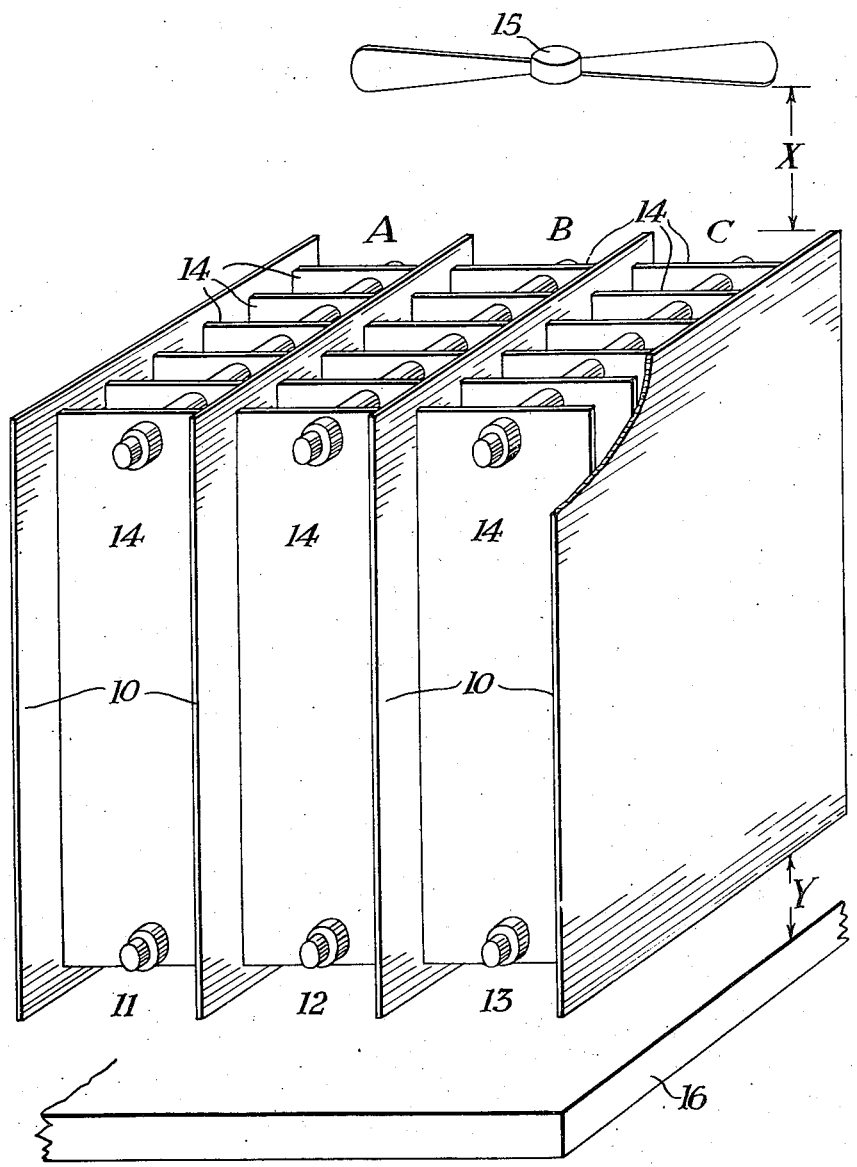

ALTERNATING CURRENT RECTIFIER OF THE DRY SURFACE CONTACT TYPE

Sydney Arthur Stevens and Leslie Ernest Thompson, London, England, assignors, by mesne assignments, to The Union Switch & Signal Company, Swissvale, Pa., a corporation of Pennsylvania Application June 9, 1937, Serial No. 147,356
In Great Britain July 1, 1936

4 Claims. (Cl. 175—366)

This invention relates to alternating current rectifiers of the dry surface contact type comprising a number of rectifier elements, and has for its object to provide an improved construction of rectifier of this character whereby the necessary cooling of the elements during operation is efficiently and uniformly effected.

Rectifiers of the kind to which this invention relates comprise a number of banks or sets of rectifier elements usually in the form of rectangular plates, each bank or set comprising a number of elements suitably spaced apart from one another so as to provide a corresponding number of intermediate spaces through which air or other suitable fluid passes for the purpose of cooling the elements by convection of the heat generated during operation. The flow of air or other cooling fluid is usually arranged to be effected by a fan or its equivalent, the several banks or sets of rectifier elements being arranged side by side in a suitable duct or passage for this purpose. It is found in practice, however, that with this arrangement the cooling action is very unequal, it being impossible to ensure a uniform distribution of the cooling current between the several banks of elements.

According to the principal feature of the present invention the several banks of rectifier elements arranged side by side within the duct or passage are arranged to be separated from each other as regards the flow of cooling fluid by suitable partitions which divide the interior of the duct or passage into a number of separate passages each containing a bank of rectifier elements. Preferably each of the passages so formed is further sub-divided by the rectifier elements themselves into a corresponding number of secondary passages so that the whole duct or passage through which the cooling fluid passes is of cellular character.

In order that this invention may be the more clearly understood reference may be made to the accompanying somewhat diagrammatic drawing which illustrates by way of example one convenient form of rectifier installation according to the present invention.

Referring now to the drawing, the alternating current rectifier therein illustrated comprises three banks of rectifier elements A, B and C arranged side by side and disposed within a duct or passage (not shown) through which air or other cooling fluid is passed. In accordance with the present invention these three banks of rectifier elements are separated from each other as regards the flow of cooling fluid by partitions 10 which divide the interior of the duct or passage of the cooling fluid into a number of separate passages 11, 12 and 13 each containing one of the banks of rectifier elements. The passages 11, 12 and 13 thus formed are further sub-divided by the rectifier elements 14 themselves which extend from partition to partition as shown into a corresponding number of secondary passages so that the cooling fluid duct or passage is of cellular character.

The partitions 10 are preferably composed of insulating material or otherwise are arranged to be insulated from the rectifier elements so as to avoid short-circuiting and the whole rectifier assembly is preferably mounted with the axes of its component passages vertical. The fan or its equivalent (illustrated diagrammatically at 15) is arranged above the rectifier elements and the rectangular upper end of the duct (not shown) is connected to the circular fan inlet by a suitable smooth stream-lined connecting passage or duct section.

A filter device composed for example of wire gauze 16 is preferably arranged below the rectifier elements so as to intercept dust particles or the like entrained in the stream of fluid entering the lower end of the duct under the action of the fan 15, this device also serving to break up the entering stream of fluid and assist in ensuring uniformity of flow over the whole cross-sectional area of the duct.

It is found to be advantageous to arrange the inlet to the fan 15 and the filter 16 at predetermined vertical distances X and Y respectively above and below the rectifier elements with a view to preventing disturbance of the stream of fluid immediately adjacent its point of entry to and exit from the passages between the several rectifier elements.

The filter device 16 is preferably made readily visible and also detachable for cleaning purposes and instead of presenting a substantially flat surface to the air passing therethrough may be of V-shape or other form to provide an increased area of filtering surface.

The invention is evidently not limited to the particular construction and arrangement above described, which may be varied as desired to meet particular conditions of operation without exceeding the scope of the invention.

Having now particularly described and ascertained the nature of our said invention and in what manner the same is to be performed, we declare that what we claim is:

1. An alternating current rectifier comprising a plurality of banks of rectifier elements arranged side by side within a duct or passage through which cooling fluid passes and separated from each other as regards the flow of cooling fluid by insulating partitions against which the edges of the elements abut and which partitions divide the interior of the duct into a number of separate passages each containing one of said banks of rectifier elements, the elements of each bank being spaced from each other in a manner to sub-divide each passage into a plurality of secondary cell-like passages, whereby a uniform distribution of the cooling fluid is obtained and the cooling fluid is caused to come into direct contact with a large portion of the outer surface of each element.

2. An alternating current rectifier comprising a plurality of banks of rectifier elements arranged side by side within a duct or passage through which cooling fluid passes and separated from each other as regards the flow of cooling fluid by insulating partitions against which the edges of the elements abut and which partitions divide the interior of the duct into a number of separate passages each containing one of said banks of rectifier elements, the elements of each bank being spaced from each other in a manner to sub-divide each passage into a plurality of cell-like passages, whereby the banks are effectively insulated from each other and a uniform distribution of the cooling fluid is obtained.

3. An alternating current rectifier comprising a plurality of banks of rectifier elements arranged side by side within a duct or passage through which cooling fluid is adapted to pass and separated from each other by insulating partitions against which the edges of the elements abut and which partitions divide the interior of the duct into a number of separate passages each containing one of said banks of rectifier elements, said partitions and said elements being vertically disposed and said elements being spaced from each other in a manner to sub-divide each passage into a plurality of secondary cell-like passages, and means for forcing cooling fluid through said cell-like passages to provide uniform cooling of said elements by direct contact of the cooling fluid with a large portion of the surface of each element.

4. An alternating current rectifier comprising a plurality of banks of rectifier elements arranged side by side within a duct or passage through which cooling fluid is adapted to pass and separated from each other by partitions which divide the interior of the duct into a number of separate passages each containing one of said banks of rectifier elements, said partitions and said elements being vertically disposed and said elements being spaced from each other in a manner to sub-divide each passage into a plurality of secondary cell-like passages, means disposed adjacent one end of said rectifier for drawing air through said cell-like passages to provide rapid direct cooling of said elements, and means disposed adjacent the other end of said rectifier for filtering the air which is drawn through said passages before it enters said passages.

SYDNEY ARTHUR STEVENS.
LESLIE ERNEST THOMPSON.